Feb. 3, 1953 — H. S. OGDEN — 2,627,351
FILTER
Filed Oct. 17, 1949 — 3 Sheets-Sheet 1

INVENTOR.
Hubert S. Ogden

Feb. 3, 1953  H. S. OGDEN  2,627,351
FILTER
Filed Oct. 17, 1949  3 Sheets-Sheet 3

INVENTOR.
Hubert S. Ogden

Patented Feb. 3, 1953

2,627,351

UNITED STATES PATENT OFFICE 2,627,351

FILTER

Hubert S. Ogden, Los Angeles, Calif.

Application October 17, 1949, Serial No. 121,767

2 Claims. (Cl. 210—179)

The basic concept in the present invention is readily applicable to any portable filtering unit, as a facile, low cost and efficient means to filter foreign and/or undesirable matter from flowing fluids or gasses, and to those familiar with the art of filtration, it will be readily apparent that the present invention is applicable to a wide range of services, including automotive lubricating systems, however, the invention in its present embodiment is primarily adapted to use in domestic water supply pipes or water supply lines for other purposes, wherein it is desired to remove fluid borne matter therefrom, and to this end it is a prime object of the invention to provide a new and improved, low cost, and highly efficient domestic water filter.

Another object of the invention is to provide a filter of the afore-mentioned character, which is easily installed and serviced with the aid of very simple tools and with but an elementary understanding of mechanical devices.

A further object of the invention is to provide a novel means to introduce a fluid for filtering to the filtering mass whereby the whole thereof is more efficiently used than has heretofore been the case.

A further object of the invention is to provide a novel means to facilitate the passage of filterable fluids through a filtering mass.

A still further object of the invention is to provide a filter unit having radially directed ducts extending from the exterior of the filter mass to a terminal point in the interior thereof, and including radially directed ducts separated from the first mentioned thereof, and extending from the interior of the filter mass to a medial, vertical bore therein, so as to facilitate rapid filtration.

It is a specific object of the invention to provide a filter, including a case therefor, wherein provision is made for the alternate, spaced positioning of discs formed and positioned with respect to one another to create inwardly directed passage-ways for an in-flow of filterable fluids, and for drainage of filtered fluid from filter pads placed between the said discs, to a central drainage area terminal in the case afore-mentioned.

Other objects, as well as features and advantages of the invention may be noted from a study of accompanying drawing, the detailed specification, and the subjoined claims.

Figure 4:
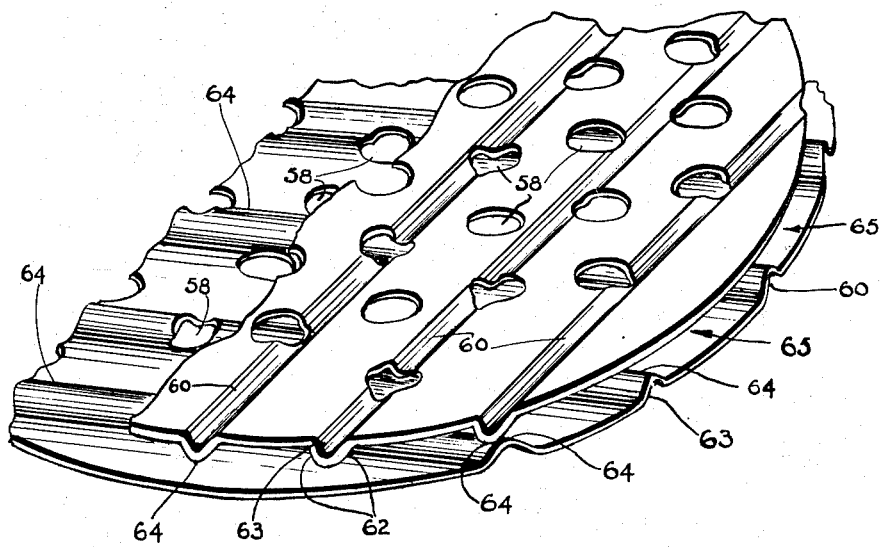

Figure 4 is a perspective view in which the perforated discs are broken away to show that the discs are superposed upon one another and that the valleys thereof are disposed at right angles to one another to form channels through which water enters into the mass of the filtering material and to facilitate the outward flow of filtered fluid therefrom, and is adapted to best show the construction thereof.

Figure 5:
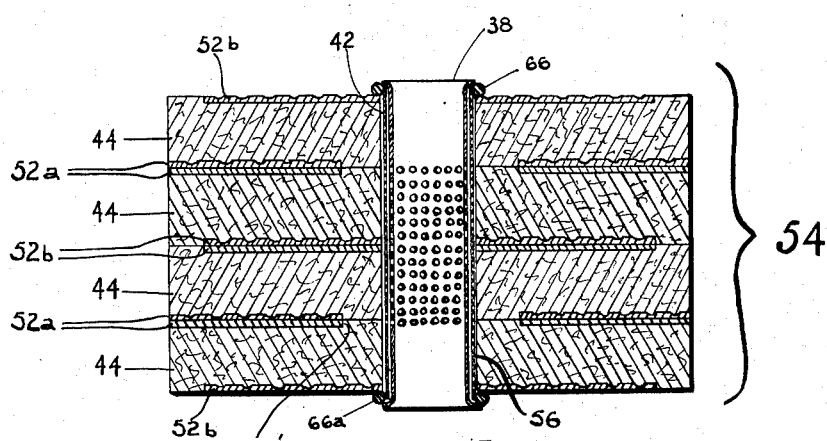

Figure 5 is a view showing the filtering means separated from the housing within which it is normally positioned, here the filter pads, the seepage or drainage discs, a fabric sleeve and a perforated tube are shown as a unit, which forms an entity for filtering purposes and is discardable after loss of efficiency.

In the drawing the reference numeral 10 indicates the filtering device of this invention as a whole, and wherein a housing or bowl 12 is integrally secured, as by welding, to a boss-like pipe adaptor 14, having threaded inlets 16 and 18 to facilitate installation, it being understood that only one thereof would be used, while the other would be suitably plugged. The inlets 16 or 18 being adapted to admit an inflow of water through a passageway 17 to the chamber 12a in the lower interior part of the bowl. A threaded outlet 20 in open communication at 22 with an internally threaded recess in the upper portion of the adaptor is designed to permit an out-flow of water therefrom.

A shaft 24 having radial bores 26 and a medial longitudinal bore 28 intersecting the radial bores, is threadedly secured at 30 to the adaptor 14, and when so positioned extends upwardly through the medial vertical center of the bowl. A cover plate 11 under screw thread pressure exerted by a wing nut 13 upon the shaft 24 is adapted to close the top of the bowl. Sealing rings 15 and 19 are adapted, in conventional manner, to prevent loss of fluid from the bowl when working under normal water pressure.

A compression plate 32 having an annular, apertured, dependent flange resting upon the bottom surface of the bowl for partial support and having a bell shaped tubular portion having a throat 37 slip fitted upon the shaft 24 and bearing upon the inner end of the adaptor 14 for partial support thereof, is adapted to form the basic support for a series of filter pads and fluid admitting and drainage discs to be hereinafter described.

A perforated tubular sleeve 38 is slip fitted over the shaft 24 in clearance thereof to form an elongated, annular passageway 40 for outflow of filtered water through the radial bores 26 and the bore 28 to the outlet connection 20 in the adaptor 14. A fibre free sleeve 42 formed of a fabric such as one of the synthetics, is placed over the tubular sleeve to retain such fibre or lint as may become disengaged from the filter pads 44.

A pressure plate 46 in the top of the housing or bowl 12 is generally similar to the pressure plate 32 in that it is also formed with a peripherial flange 46a which bears upon the sealing ring 15 when the unit is in functional use, while a medial centrally located tube or throat 48 having an inturned annular flange 50 in sliding contact with the shaft 24 upon which it is centered in clearance of the upper end of the sleeve 38.

Between the compression plates 32 and 46 and centered around the sleeve 38, I place a plural number of the filter pads 44 and a complementary number of the special infiltration and drainage discs 52a and 52b positioned between each of the adjacent filter pads 44, and which when taken together as a unit 54, comprises the principal novelty of the invention.

The filter pads 44 are formed of conventional fibrous filtering material which is compacted to give the pads a reasonable degree of density, and as shown, are circular in shape and have a medial, central opening 56 therein so that they may be slid downwardly over the sleeve 38 to rest in laminated form upon the compression plate 32.

Sealing rings 66 and 66a perform the function of holding assembly 54 together as a unit and also act as seals to prevent passage of liquid longitudinally along the external portion of sleeve 42, thereby directing the flow through sleeve 42 and perforation in sleeve 38.

Figure 2:
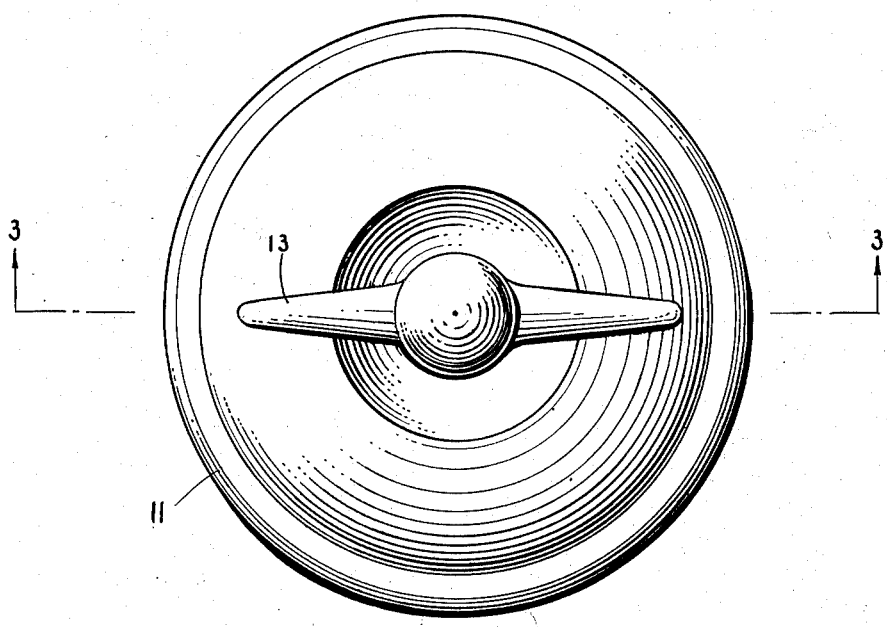
Figure 2 is a plan view thereof.
Figure 1:
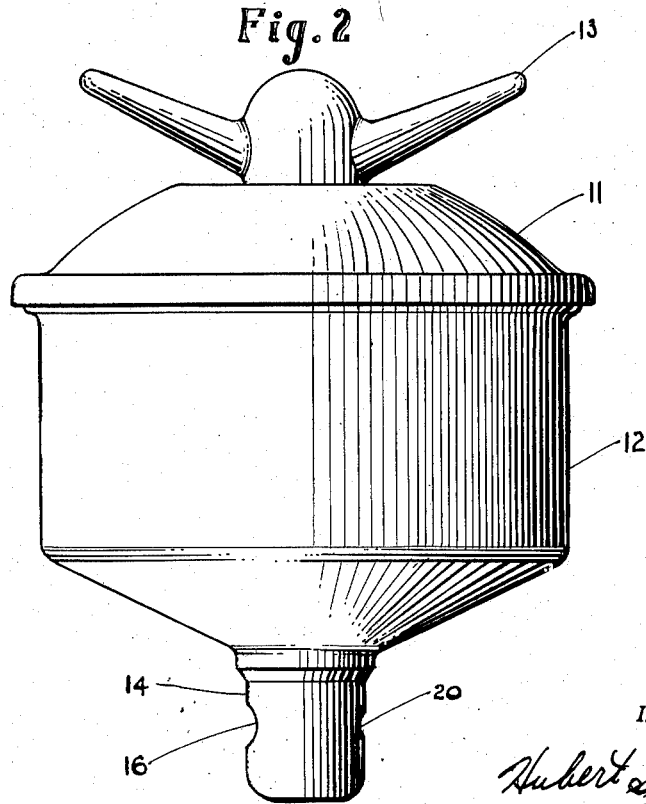
Figure 1 is a side-elevational view of the filter of this invention.
Figure 3:
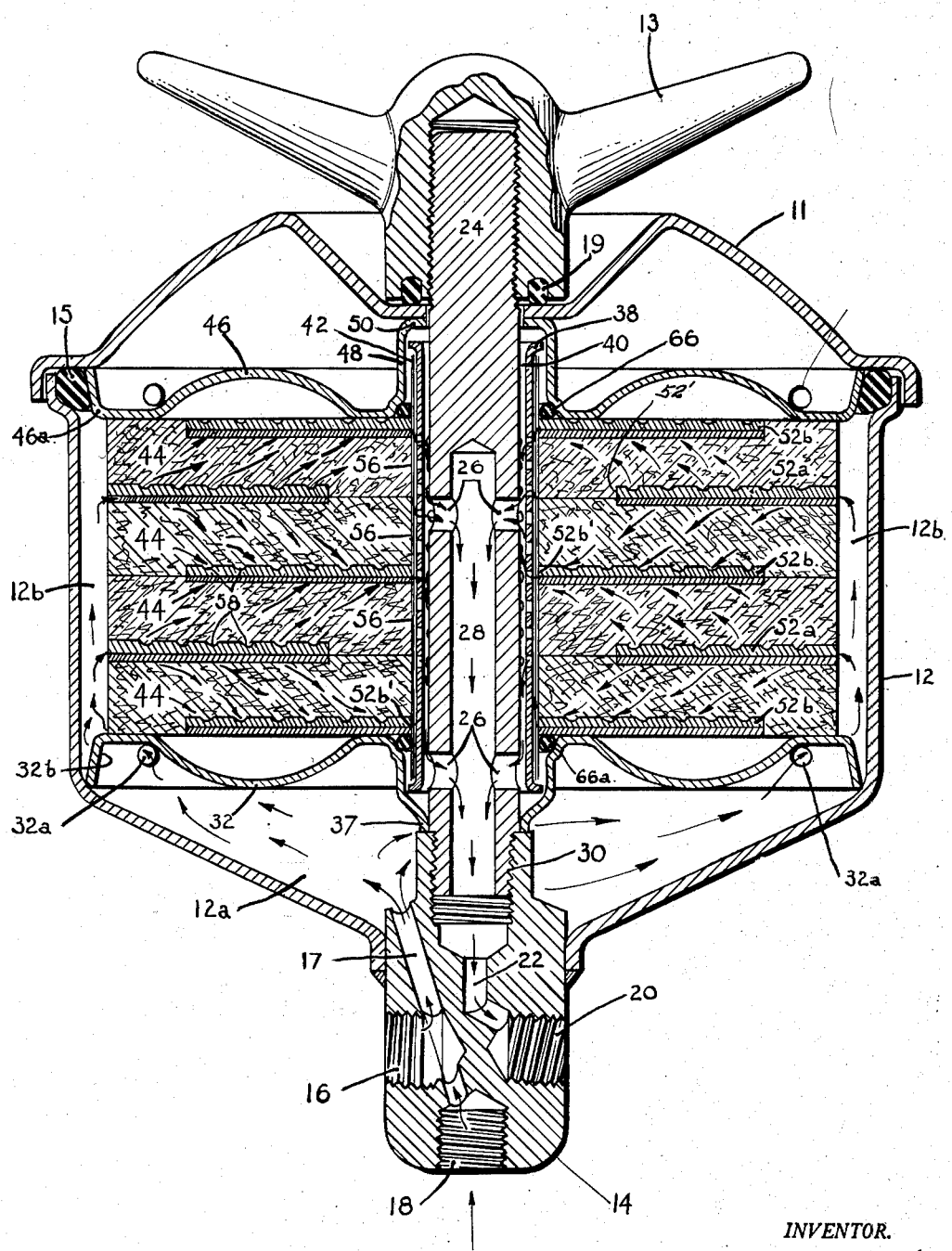
Figure 3 is a vertical sectional view showing the nature of and the disposition of elements of the interior of the filter.

The number of discs 52a and 52b which I use in a filter unit depends of course upon the rated capacity thereof. Reference to Figure 3 will show that in the unit illustrated, I have included four of the filter pads 44, and that I have placed a pair of the discs 52a and 52b between adjacent filter pads, and that single discs have been placed upon the top and bottom of the laminated pile thereof. The figure also shows that certain of the discs are so dimensioned as to extend from the periphery of the stacked pads to a point in the interior thereof, but not to the central opening 56 therein, while others of the discs extend from the central opening 56 to a point in the interior of the stacked filter pads, but not to the periphery thereof.

The larger of these discs are indicated by the numeral 52a, while the smaller thereof are indicated by the numeral 52b, however, in all respects other than the face diameter thereof, these discs are identically constructed, that is, they are formed of sheet metal having a plural number of apertures 58 punched therethrough for the transit flow of fluids, and are formed with spaced, parallel V-shaped ribs 63 which define channels 60 between the inclined sidewalls 62 and the crown 64 thereof.

The discs positioned intermediately of the ends of the unit are placed in pairs, and are so disposed with respect to one another, that the ribs 63 of the one disc lay upon and at right angles to the ribs of the other of the pair thereof.

This arrangement enables fluid flowing through inlet ports 16 or 18, the passageway 17, the chamber 12a, and through the apertures 32a in the compression plate 32 to the annular space 12b between the bowl and the filter pads 44, to flow through the channels 60 and the valleys 65 between the ribs to points in the interior of the filter pads and then to flow laterally through the apertures 58 in the discs 52a for filtering through the pads 64 to the low pressure sides of the filter unit 54 which is represented by the channels 60 and the valleys 65 in the discs 52b into which the filtered fluid will seep through the apertures 58 therein for collection and drainage through the said channels and valleys 60 and 65 therein to the central openings 52b', from which point the clarified fluid passes through the fabric sleeve 42, and the perforated sleeve 38 to the annular passageway 40 from which it flows through the radial bores 26 to the bore 28 in the shaft 24, and thence downwardly through the passageway 22 to the outlet 20 in the adaptor 14 and to the consumer's service outlet.

The preceding description is inclusive of the structural detail involved in my new and improved filter, and it is submitted that from a study thereof, when taken together with the drawings, it will be apparent that I have conceived a novel arrangement wherein the whole of the mass of the filter pads or a very substantial portion thereof, is caused to be of service in filtering matter from the filter fluid, rather than the exterior surface thereof, as is the case in all filters of which I am aware, thereby extending the life of the filter unit beyond normal expectancy and render it more efficient during such period. After the filtering unit has lost its efficiency due to clogging with impurities, the old unit may be removed by unthreading the wing nut from the shaft 24 for removal of the cover plate 11 and the top compression plate 46 and the filter unit 54 therefrom. After flushing and cleaning the bowl, a new unit 54 may be placed therein and sealed against loss of fluid by reversal of the opening operation.

Having thus described my invention in its presently preferred form, but without limitation thereto, that which I believe to be novel and for which I seek Letters Patent, is as follows:

1. As an article of manufacture, a fluid filter unit adapted in use to be positioned within a fluid pressure chamber provided with means to control the flow of fluid to and from the chamber, said unit comprising an apertured tube having flared open ends, a lintless fabric sleeve enveloping the exterior of said tube between the ends thereof, a plural number of centrally apertured stacked filter pads centrally upon and concentric with said tube, and perforate channeled seepage plates, said channeled seepage plates being centered upon and concentric with said tube and positioned in pairs thereof between said filter pads, there being single seepage plates upon the top surface and upon the bottom surface of a stack of said filter pads, said seepage plates being deformed from a plane surface to a rippled surface comprising a plural number of concaved ribs in parallelism thereacross, the seepage plates in pair thereof being so disposed with respect to one another as to define clear channels between said ribs, the channels of certain of said seepage plates extending from the periphery of said filter pads to points interior thereof and others of said seepage plates having channels beginning interior of said filter pads and terminating in coincidence with the central aperture in said filter pads, the seepage plates upon the top and bottom of said filter unit being disposed in a manner coincidental with said others of said seepage plates last mentioned.

2. In a filter, a bowl and a detachable cover for the bowl, an adaptor secured to the bowl for the inlet and outlet of fluids with respect thereto, a medial vertical shaft threadedly secured to said adaptor and having intersecting bores therein in open communication with an outlet in said adaptor, a perforated sleeve centered around said shaft so as to define an annular space therebetween, an upper and a lower plate centered upon said shaft transecting said bowl so as to form separated chambers therein, the flanges of said plates being apertured so as to enable fluid to flow from said adaptor to each of said chambers, filter units positioned between said apertured flanged plates in annular spaced relationship to the inner surface of said bowl, and apertured annular discs between said filter units, said apertured annular discs being deformed from a horizontal plane so as to have uni-directional and parallel concaved ribs thereon whereby upon placing a pair thereof in face contact with the ribs on one disc angularly disposed with respect to the ribs on the other disc of the pair thereof unrestricted drainage channels are defined leading from the exterior of said filter units to points interior thereof and from points interior thereof to points in open communication with said perforated sleeve.

HUBERT S. OGDEN.

REFERENCES CITED

The following references are of record in the file of this patent:

UNITED STATES PATENTS

| Number | Name | Date |
|---|---|---|
| 612,105 | Hendrick | Oct. 11, 1898 |
| 634,947 | Loew | Oct. 17, 1899 |
| 816,479 | Klein | Mar. 27, 1906 |
| 824,487 | Klein | June 26, 1906 |
| 969,224 | Turek | Sept. 6, 1910 |
| 2,076,935 | Burckhalter | Apr. 13, 1937 |
| 2,134,061 | Thomas | Oct. 25, 1938 |
| 2,313,612 | Alsop | Mar. 9, 1943 |
| 2,508,976 | Tessmer, Sr. | May 23, 1950 |

FOREIGN PATENTS

| Number | Country | Date |
|---|---|---|
| 4,286 | Great Britain | 1883 |
| 13,466 | Great Britain | 1899 |
| 672,365 | France | Sept. 16, 1929 |